(12) United States Patent
Koubiadis et al.

(10) Patent No.: US 10,247,815 B1
(45) Date of Patent: Apr. 2, 2019

(54) PHASED ARRAY RADAR SYSTEM WITH SPECULAR MULTIPATH MITIGATION

(71) Applicant: Lockheed Martin Corporation, Bethesda, MD (US)

(72) Inventors: Fotis P Koubiadis, Bordentown, NJ (US); Jude C Giampaolo, Bensalem, PA (US); John A MacLachlan, Mount Laurel, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 298 days.

(21) Appl. No.: 15/167,129

(22) Filed: May 27, 2016

(51) Int. Cl.
G01S 13/42 (2006.01)
G01S 7/292 (2006.01)
G01S 13/02 (2006.01)

(52) U.S. Cl.
CPC .............. G01S 13/42 (2013.01); G01S 7/292 (2013.01); G01S 2013/0254 (2013.01)

(58) Field of Classification Search
CPC .. G01S 13/42; G01S 7/292; G01S 2013/0254; G01S 13/9029; G01S 13/532; G01S 13/4418; H01Q 21/08; H01Q 3/22
USPC ........................................................ 342/375
See application file for complete search history.

(56) References Cited

U.S. PATENT DOCUMENTS

| | | | |
|---|---|---|---|
| 4,449,127 A | 5/1984 | Sanchez | |
| 5,191,342 A | 3/1993 | Alsup et al. | |
| 5,371,503 A * | 12/1994 | Bower | G01S 13/4418 342/148 |
| 6,362,774 B1 * | 3/2002 | Green | G01S 13/532 342/175 |
| 6,901,062 B2 | 5/2005 | Scherzer et al. | |
| 7,423,578 B1 * | 9/2008 | Tietjen | H01Q 21/08 342/157 |
| 7,999,212 B1 | 8/2011 | Thiesen et al. | |
| 8,854,252 B2 | 10/2014 | Holder | |
| 2008/0129584 A1 * | 6/2008 | Antonik | G01S 13/9029 342/25 B |
| 2009/0015474 A1 * | 1/2009 | Wicks et al. | H01Q 3/22 342/372 |
| 2009/0278732 A1 * | 11/2009 | Antonik | G01S 13/9029 342/25 B |

FOREIGN PATENT DOCUMENTS

FR 2863110 A1 * 6/2005 ............. H01Q 21/08

* cited by examiner

*Primary Examiner* — Bernarr E Gregory
(74) *Attorney, Agent, or Firm* — Howard IP Law Group

(57) ABSTRACT

A phased array radar system comprises an array antenna including a plurality of selectively controllable transmit/receive (T/R) modules. One or more computer processors and associated memory devices are provided in communication with the plurality of T/R modules. The control processor is configured to cause the transmission of a first plurality of radio frequency (RF) pulses from a first portion of the array antenna, wherein the first plurality of pulses comprise at least two pulses having distinct center frequencies. A second plurality of RF pulses are transmitted from a second portion of the array antenna, wherein the second plurality of pulses comprise at least two pulses having distinct center frequencies. Received return signals originating from the first and second plurality of transmitted pulses are non-coherently integrated prior to the performance of target detection operations.

17 Claims, 11 Drawing Sheets

PHASED ARRAY RADAR SYSTEM WITH SPECULAR MULTIPATH MITIGATION

FIELD OF THE INVENTION

The present invention relates to signal processing systems and methods, and more particularly, to a radar system and method of operation thereof.

BACKGROUND

Signal processing systems, such as radar and sonar systems, are useful for detecting, characterizing and monitoring various kinematic parameters associated with natural and/or man-made objects, and are important for both civilian and military operations. In radar systems, for example, one or more transmitted electromagnetic (EM) signals, referred to herein as radio frequency (RF) waveforms or pulses, are intended to engage one or more objects or targets. Reflected return signals (or echoes) are received and processed for object identification and characterization. Several types of transmitted signals may be used. For example, single pulse and multiple pulses of linear frequency modulated (LFM) waveforms may be used, with each waveform type having particular advantages in terms of target detection and velocity and acceleration estimation, by way of example only.

Surface radar systems that track targets at low elevation angles (e.g., less than 5 or 10 degrees) are adversely affected by specular multipath, or interferences which occur when a radar system receives return signals arising from discrete, coherent reflections (e.g., from surfaces such as standing water), in addition to direct line-of-sight (LOS) signals. As a result, target track metrics, such as elevation angle estimates, radar cross-section (RCS) estimates, range estimates and target sensitivity/detectability are often severely degraded at these low elevation angles. The impact of specular multipath also varies as a function of the propagation environment being operated in (e.g., standard atmosphere, evaporative ducting, sub-refractivity) as well as any surface roughness, which in many real-time applications are not know a priori. Moreover, precision track radar systems need to support multiple missions and functions simultaneously, and thus, they are often limited in available radar resources to address these problems.

Improved systems and methods for mitigating adverse track metric effects of specular multipath are desired.

SUMMARY

In one embodiment of the present disclosure, a phased array radar system is provided. The system comprises an array antenna including a plurality of selectively controllable transmit/receive (T/R) modules. One or more computer processors and associated memory devices are provided in communication with the plurality of T/R modules. The control processor is configured to cause the transmission of a first RF pulse of a first center frequency from a first portion of the antenna array, a second RF pulse of a second center frequency, distinct from the first center frequency, from the first portion of the antenna array, a third RF pulse of a third center frequency from a second portion of the antenna array, and a fourth RF pulse of a fourth center frequency, distinct from the third center frequency, from the second portion of the antenna array. Received return signals originating from the first, second, third and fourth transmitted pulses are non-coherently integrated prior to the performance of target detection operations.

In another embodiment, a method of operating a phased array radar system is provided. The method includes the steps of transmitting a first RF pulse of a first center frequency from a first portion of the antenna array, transmitting a second RF pulse of a second center frequency, distinct from the first center frequency, from the first portion of the antenna array, transmitting a third RF pulse of a third center frequency from a second portion of the antenna array, and transmitting a fourth RF pulse of a fourth center frequency, distinct from the third center frequency, from the second portion of the antenna array. Received return signals originating from the first, second, third and fourth RF pulses are non-coherently integrated, and target detection processing is performed on the resulting integrated signal.

DETAILED DESCRIPTION

Figure 1:
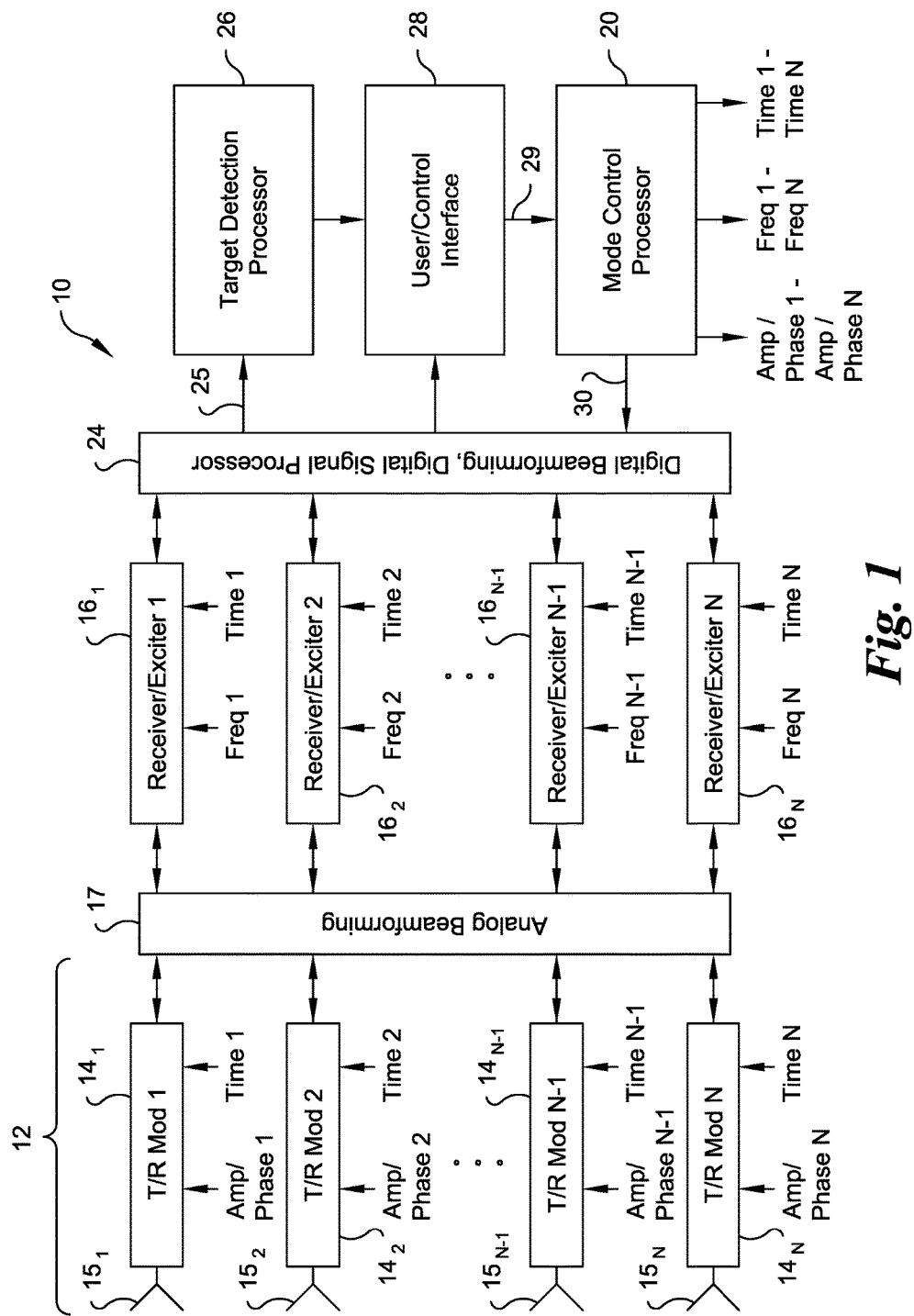
FIG. 1 is a simplified schematic diagram of a radar system according to an embodiment of the present disclosure.

It is to be understood that the figures and descriptions of the present invention have been simplified to illustrate elements that are relevant for a clear understanding of the present invention, while eliminating, for purposes of clarity, many other elements found in signal processing systems, including radar systems employing active electronic scanned arrays (AESAs). However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

As described above, low elevation operation of a radar system may adversely affect radar track metrics, including elevation angle estimates, RCS estimates, range estimates and target sensitivity/detectability. More specifically, target sensitivity and detectability are functions of the signal-to-noise ratio (SNR) of received radar return signals, as defined by the expression:

$$SNR = \frac{P_t G_t G_r \lambda^2 \tau}{4\pi kTL} \cdot \frac{RCS}{(4\pi)^2 R^4} \cdot F^4 \qquad \text{Eq. 1}$$

wherein $P_t$ represents the transmit power of the system, $G_t$ and $G_r$ represent the antenna gain on transmission and reception operations, $\lambda$ represents the transmitted wavelength, R is the range to the target, $\tau$ is the transmitted pulsewidth, kT is the noise power density of the system, L represents all system losses, and $F^4$ is the two-way propagation factor.

From this expression, RCS measurement accuracy of a true target cross-section may be characterized as the product of the true cross-section and the two way propagation factor $F^4$. Range estimate errors are inversely proportional to the square root of the SNR, and elevation angle estimate errors are inversely proportional to the square root of the SNR as well as the bias introduced by specular multipath effects on the received return signals.

Embodiments of the present disclosure include a radar system and method of operation thereof which utilizes an active phased array radar (APAR), such as an active electronic scanned array (AESA), to efficiently mitigate the adverse track metric effects of specular multipath. Embodiments of the present disclosure implement frequency diversity, spatial (array) diversity and improved multipath elevation bias correction, without requiring significant instantaneous radar bandwidth capability, resource intensive advanced algorithms and waveforms that would otherwise adversely impact precision low elevation track latencies, nor a priori knowledge of the propagation environment or surface roughness.

Referring generally to FIG. 1, embodiments of the present disclosure will be described herein as implemented into an exemplary AESA radar system 10. Radar system 10 comprises RF front end electronics 12. RF front end electronics 12 are populated with a plurality of individually controllable radiating elements, embodied herein as transmit/receive (T/R) modules $14_{1-N}$ each comprising integrated amplifiers, amplitude control and phase shifters, for performing transmission and reception operations via respective antenna element $15_{1-N}$. In other embodiments, the amplitude control and phase shifters can be included in the digital signal processor 24 as part of the beamforming function of the system (not shown).

In the exemplary system 10, receivers and exciters are embodied as a plurality of N integrated receiver/exciter elements $16_{1-N}$, each corresponding to a respective one of T/R modules $14_{1-N}$. In this embodiment, the digital signal processor 24 performs all beamforming functions of the system. In other embodiments, separate exciters and receivers may be provided. As will be understood by one of ordinary skill in the art, receiver/exciter elements $16_{1-N}$ are responsive to input signals received from a digital signal processor or waveform generator 24 via a plurality of digital-to-analog converters (DACs, not shown) for generating RF signals to be provided to T/R modules $14_{1-N}$. In other embodiments, the DACs may be integrated as part of the plurality of the receiver/exciter elements $16_{1-N}$. An optional analog beamformer 17 comprising a plurality of combiners and splitters may be provided for distributing the desired RF waveforms to T/R modules $14_{1-N}$ (on transmit) and distributing the returned RF signal to receiver/exciter elements $16_{1-N}$ (on receive). In this analog beamforming embodiment, the desired waveform from one of the receiver/exciter elements $16_{1-N}$ is distributed to more than one T/R module $14_{1-N}$ (on transmit), and the return signals from more than one T/R module $14_{1-N}$ are combined into one of the receiver/exciter elements $16_{1-N}$ (on receive). It should be noted that in these embodiments the total number of receiver/exciter elements in the radar system may be less than the total number of T/R modules in the radar system (not shown).

In operation, pulses or waveforms transmitted by T/R modules $14_{1-N}$ are reflected off of one or more targets, generating return signals or echoes. Return signals are subsequently captured by T/R modules $14_{1-N}$ and communicated to receiver/exciter elements $16_{1-N}$ for analog signal processing, including down conversion operations. Receiver/exciter elements $16_{1-N}$ may include various processing components, such as one or more filters, low-noise amplifiers and down converters, as will be understood by one of ordinary skill in the art.

The outputs of receiver/exciter elements $16_{1-N}$ may be in digital form or are converted to digital form for further processing by digital signal processor 24. Digital signal processor 24 may include, for example, pulse compression module(s) (not shown) operative to receive post-A/D digitized in-phase and quadrature-phase (I/Q) signal data from the output of receivers $16_{1-N}$, or associated ADCs responsive thereto. As will be understood by one of ordinary skill in the art, pulse compression techniques may be implemented to achieve high range resolution without the need for high-powered antennas. Pulse compression may be accomplished by various filtering and/or line delay arrangements. By way of background, pulse compression may be achieved by applying a Fast Fourier Transform (FFT) to a received time-domain signal, thereby converting the data to the frequency domain. A weighting factor, or pulse compression weight (e.g. in the form of a vector-matrix) is applied in the frequency domain. An inverse FFT (IFFT) is applied to return the data streams to the time-domain.

After pulse compression, digital signal processor 24 is configured to non-coherently integrate (i.e. without phase information) the received pulses. Specifically, non-coherent integration may be accomplished by converting input I/Q voltage data to power by computing the absolute value squared for each sample. Corresponding range cells for each frequency, pulse and antenna aperture are then summed. The integrated output or outputs 25 of digital signal processor 24 may be provided to, by way of non-limiting example, a detection processor 26 for performing target detection and measurement estimation operations. Exemplary target detection processing may be performed against a time-averaged background map. These detection processes may include one or more of "greatest of" operations, as well as perform constant false alarm rate (CFAR) detection techniques. The measurement estimation operations may include monopulse angle or maximum likelihood angle estimation. The results of this detection and measurement estimation processing may be provided to a display device (not shown) for end-user interfacing. In addition, the results of this processing may be used to inform the selection of waveforms on the subsequent PRIs.

Referring again to receiver/exciter elements $16_{1-N}$, each element is responsive to a frequency reference, such as that provided by one or more electronic or local oscillators (LOs) for generating signals of a desired frequency used in the down conversion or heterodyning operations performed thereby. In other embodiments of the present disclosure, receiver/exciter elements $16_{1-N}$ may comprise a plurality of internal LOs for performing frequency mixing operations responsive to a control signal (i.e. $Freq_1$-$Freq_N$) generated by a mode control processor 20. Receiver/exciter elements $16_{1-N}$ are further responsive to a time reference (i.e. $Time_1$-$Time_N$), which may be provided by a system clock (not shown) of mode control processor 20, for controlling the timing of the signal modulation operations performed thereby. Mode control processor 20 is further configured to generate and selectively output amplitude and phase control signals Amp/Phase$_{1-N}$ as well as timing control signals $Time_1$-$Time_N$ to respective T/R modules $14_{1-N}$. As will be understood by one of ordinary skill in the art, each of the above-described control signals may be altered in order to achieve a desired performance of system 10, including, but not limited to, selective antenna array partitioning, the performance of beam steering operations, and altering other transmission and reception characteristics.

Mode control processor 20 may be embodied as one or more processors in communication with one or more memory devices (not shown) containing suitable instructions, and/or a user or control interface for performing the operations set forth herein. Mode control processor 20 may be responsive to a user interface or control interface 28, for example, a computer executing control algorithms that generate real time, dynamic command instructions 29 derived from available 1) real time target return data (e.g. target characteristics derived from prior PRIs) in the target detection processor 26 or digital signal processor 24 and/or 2) operator provided radar mission data entered into the computer through an input device (e.g., a keyboard). These instructions may include the identification or selection of desired characteristics of operation, or the selection of specific parameters to be used by the system (e.g. desired timing, frequency, amplitude and phase control signal values to be provided to each T/R module and/or receiver/exciter). Mode control processor 20 may also be operative to output instructions 30 to digital signal processor 24, or other downstream processing devices, for commanding suitable back end signal processing for a given mode or characteristic of operation of system 10.

Figure 3:
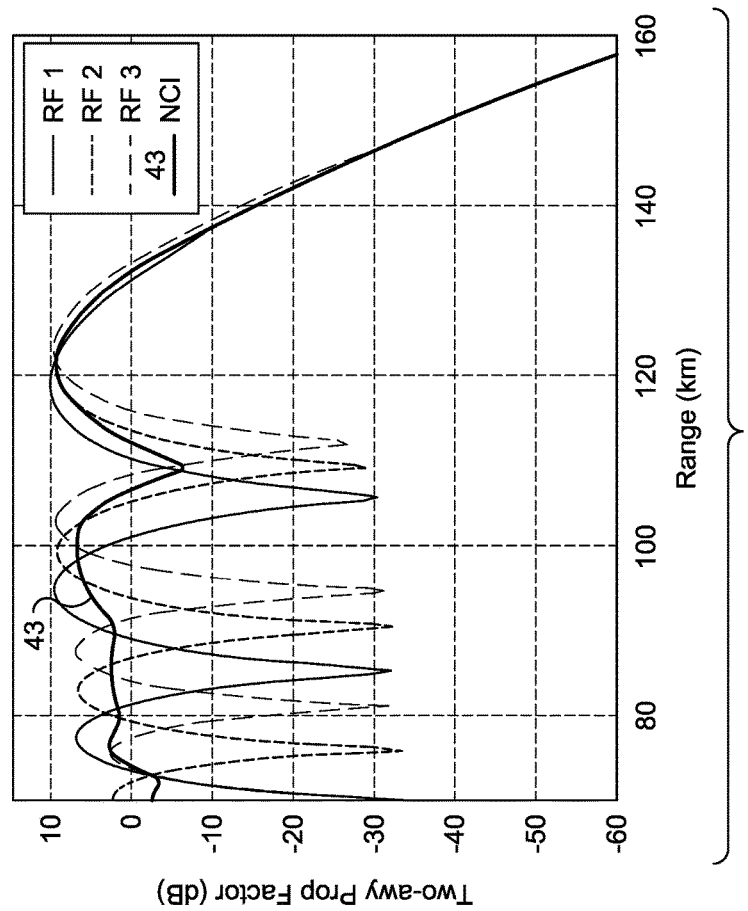
FIG. 3 is a graphical illustration of exemplary propagation factors associated with return signals originating from the transmitted pulses shown in FIG. 2.
Figure 2:
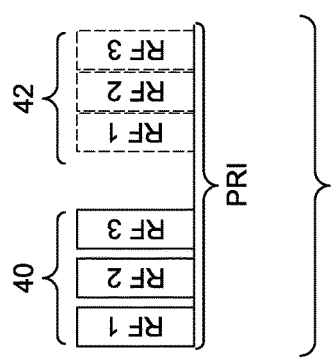
FIG. 2 is a simplified representation of a plurality of transmit pulses or waveforms and corresponding receiver windows generated according to embodiments of the present disclosure.

Referring generally to FIG. 2, adverse effects of specular multipath may be mitigated according to embodiments of the present disclosure by operating a radar system (e.g., radar system 10 of FIG. 1) in a frequency diverse manner. Specifically, embodiments of the present disclosure include the generation of a plurality of transmit pulses having center frequencies spanning up to a full radar operating bandwidth (e.g., 2.0-3.0 GHz, 3.0-4.0 GHz, or 4.0-8.0 GHz) of a given system within a single pulse repetition interval (PRI). By way of non-limiting example only, the plurality of transmit pulses may comprise at least two transmitted pulses having distinct center frequencies. Other embodiments may include a first transmitted pulse having a center frequency at or near (e.g., within 1%, 2%, 5% or 10%) the minimum operating frequency of the radar system, and a second transmitted pulse having a center frequency at or near (e.g., within 1%, 2%, 5% or 10%) the maximum operating frequency of the radar system. Other embodiments may include one or more additional intermediate pulses having center frequencies between the first pulse and the second pulse. In the exemplary illustration, three independently steered, sequentially transmitted pulses 40 (RF1,RF2,RF3) are illustrated, as well as a corresponding three independently steered reception windows or patterns 42 (RF1,RF2,RF3). Each pulse and reception pattern may be generated using one or more T/R modules and receiver/exciters of an active phased array antenna (e.g., T/R modules $14_{1-N}$ and receiver/exciters $16_{1-N}$ of FIG. 1). FIG. 3 illustrates the two-way propagation factor $F^4$ performance as a function of range for the three exemplary transmitted pulses 40 having center frequencies equal to 3.0 GHz, 3.5 GHz and 4.0 GHz, respectively. By non-coherently integrating each of the pulse compressed time interleaved return signals that span up to the full radar system operating bandwidth, indicated by trace 43, reductions in signal fading and bias errors are realized, all within a single PRI and without requiring significant instantaneous radar bandwidth capability.

Figure 4:
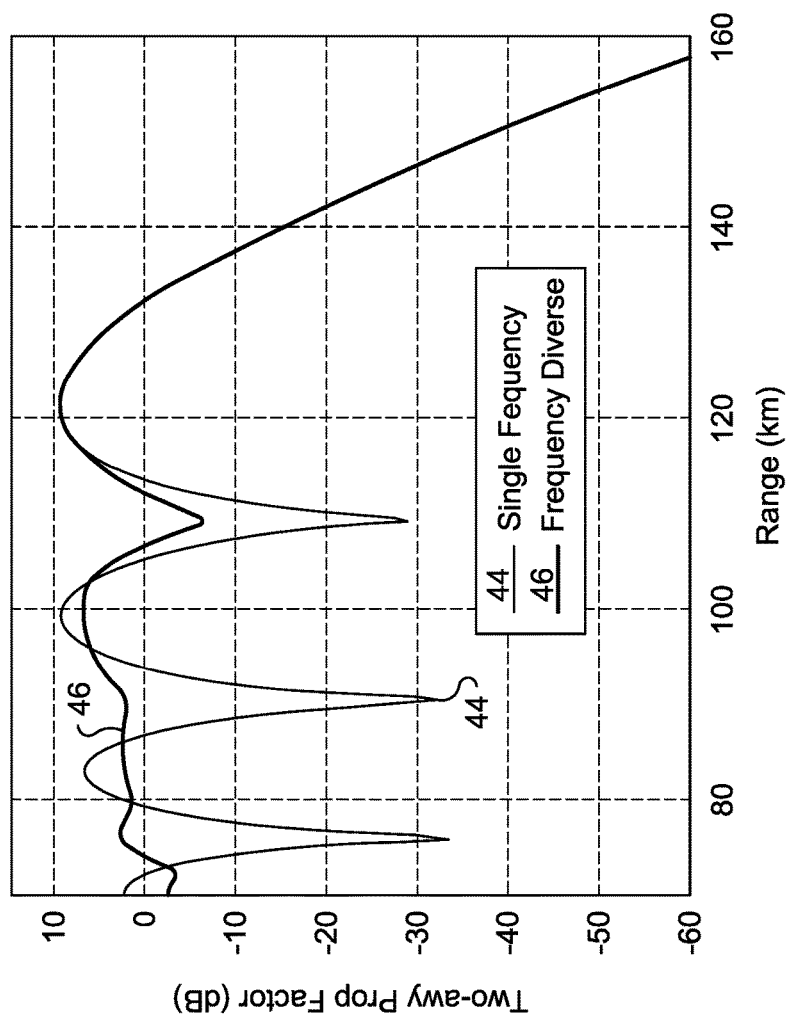
FIG. 4 is a graphical illustration comparing propagation factor performance between a radar system operating with a single narrowband frequency, and a radar system operating in a frequency diverse mode according to embodiments of the present disclosure.
Figure 5:
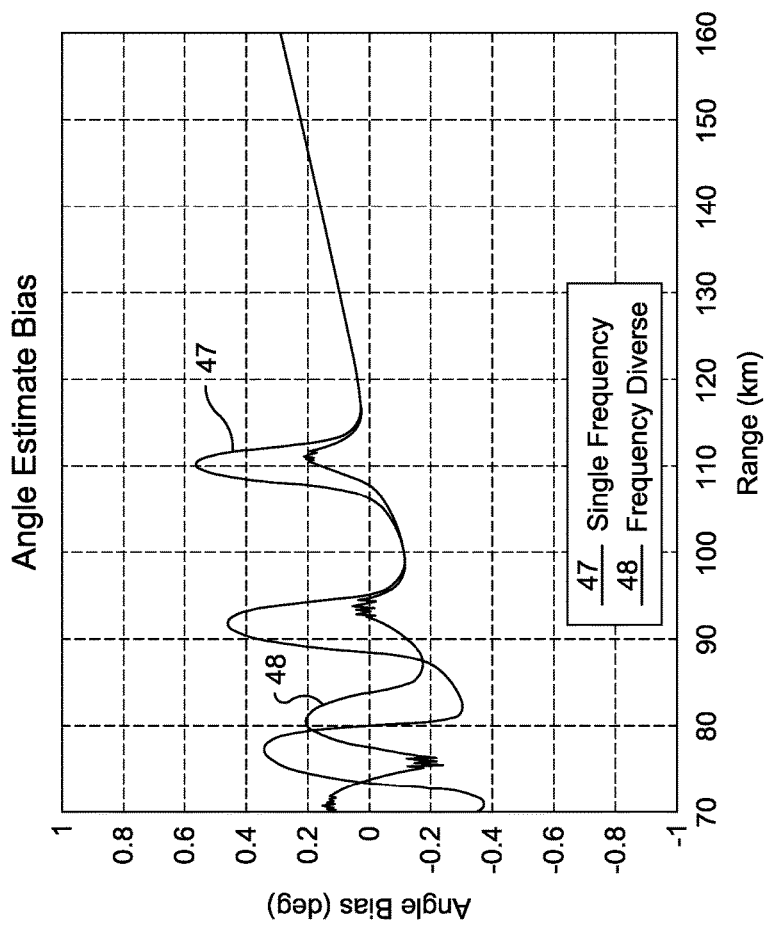
FIG. 5 is a graphical illustration comparing elevation angle bias performance between a radar system operating with a single narrowband frequency, and a radar system operating in a frequency diverse mode according to embodiments of the present disclosure.

Similarly, FIG. 4 further illustrates SNR benefits realized between a narrowband radar system operating at a single frequency within a single PRI and a time interleaved broadband radar system implementing frequency diversity within a single PRI according to embodiments of the present disclosure. Assuming a 1000 meter (m) target altitude and a 15 m radar altitude for a single 3.5 GHz transmitted pulse, the resulting single frequency two-way propagation factor $F^4$ is indicated by trace 44. Trace 46 represents a frequency diverse mode of operation according to embodiments of the present disclosure, wherein the three exemplary transmitted pulses 40 (RF1,RF2,RF3), having center frequencies equal to 3.0 GHz, 3.5 GHz, and 4.0 GHz, have been non-coherently integrated, resulting in a reduction of signal fading over the illustrated target range that spans the low elevation region. In addition to propagation factor improvements, frequency diverse modes of operation according to embodiments of the present disclosure also improve the elevation angle bias performance of the system. For example, FIG. 5 illustrates elevation angle bias improvement realized between the narrowband, single-frequency mode of operation and the frequency diverse mode of operation of the systems set forth above with respect to FIG. 4. As shown, non-coherent integration of the frequency diverse pulses as indicated by trace 48 minimizes elevation angle bias compared to the single frequency pulse represented by trace 47.

Figure 6:
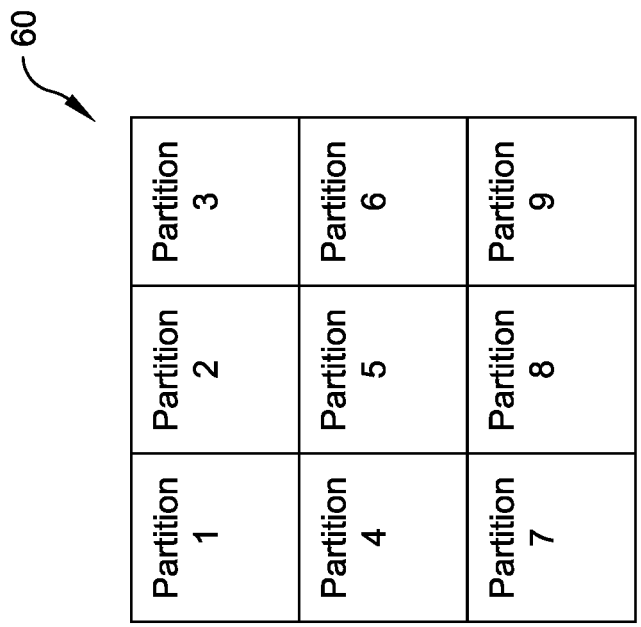
FIG. 6 is a simplified illustration of an exemplary partitioned phased array antenna operated in a spatially diverse mode according to embodiments of the present disclosure.

In addition to frequency diverse operation of a radar system, embodiments of the present disclosure further implement spatially diverse operation of the array for improving system performance. FIG. 6 provides a simplified illustration of a reconfigurable antenna array 60 operated with spatial diversity. More specifically, antenna array 60 may be partitioned, or dynamically configured to operate distinct portions thereof independently of one another, such that a plurality of sub-apertures are defined. As illustrated, exemplary array 60 is divided into nine discrete partitions, each capable of independent transmission and/or reception functions via selective control of a subset (e.g., one or more) T/R modules defining each partition (e.g., T/R modules $14_{1-N}$ of radar system 10 of FIG. 1).

Figure 7:
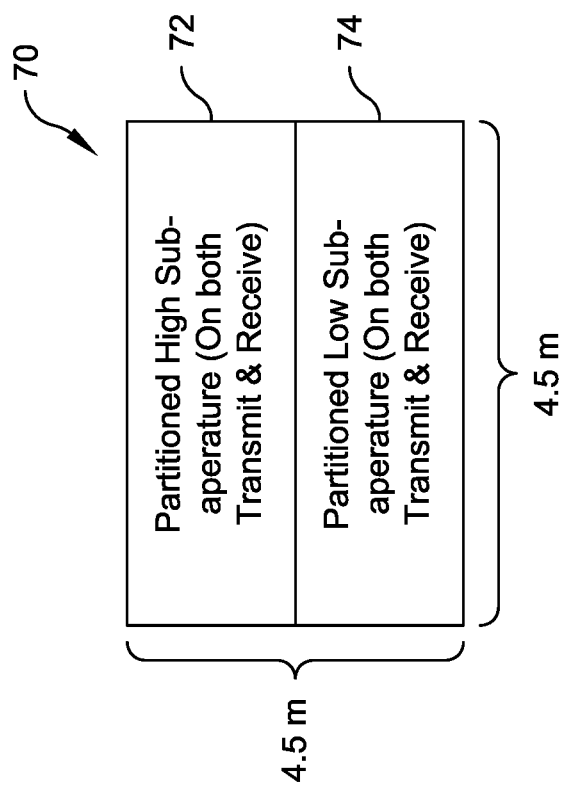
FIG. 7 is a simplified illustration of another exemplary partitioned phased array antenna operated in a spatially diverse mode according to embodiments of the present disclosure.
Figure 8:
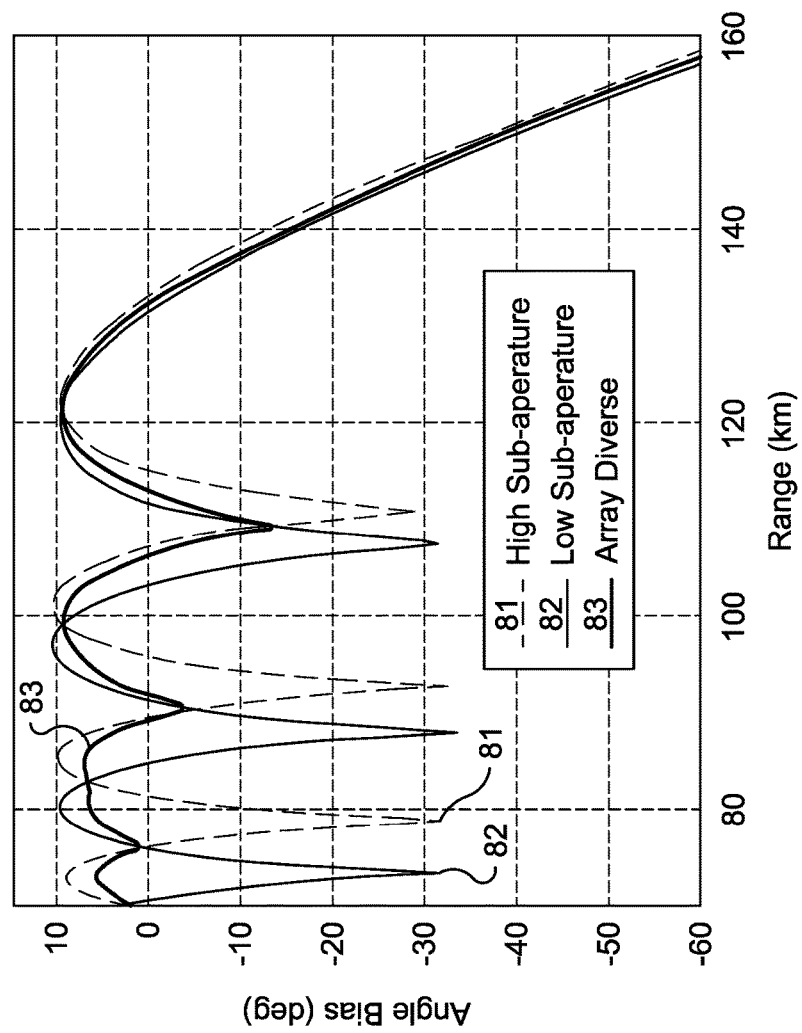
FIG. 8 is a graphical illustration comparing propagation factor performance between a radar system operating without spatial (array) diversity, and a radar system operating in a spatial (array) diverse mode according to embodiments of the present disclosure.
Figure 9:
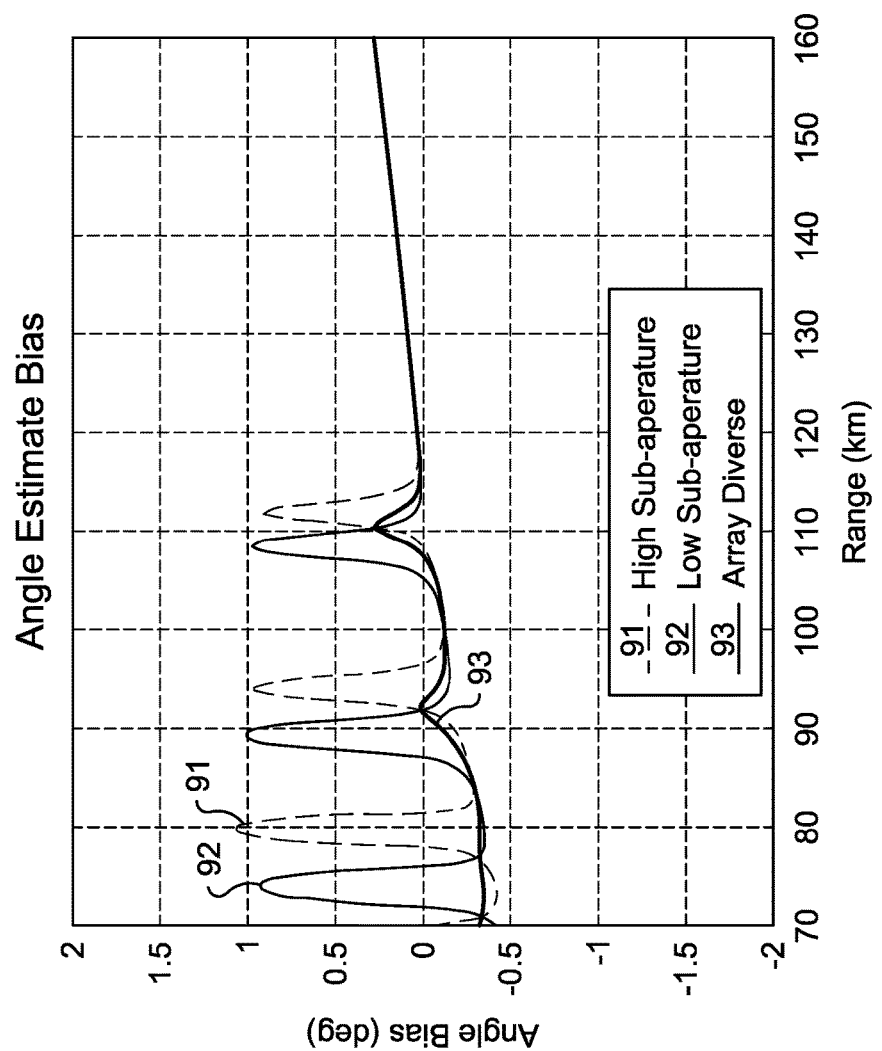
FIG. 9 is a graphical illustration comparing elevation angle bias performance between a radar system operating without spatial (array) diversity, and a radar system operating in the spatial (array) diverse mode according to embodiments of the present disclosure.

FIGS. 7-9 illustrate the benefits of the above-described spatial diversity techniques on system performance. In particular, FIG. 7 shows an exemplary 4.5 m×4.5 m antenna array 70 operated as two discrete sub-apertures or partitions 72,74, each independently performing both transmit and receive operations. FIG. 8 illustrates resulting two-way propagation factors $F^4$ as a function of range for a 1000 m altitude target and a 3.5 GHz pulse output (e.g., simultaneously) from each sub-aperture 72,74, each with a different waveform modulation (traces 81 and 82, respectively). Trace 83 indicates the realized improved propagation factor performance achieved after the non-coherent integration of received signals from each of sub-apertures 72,74. Similarly, FIG. 9 illustrates improved elevation angle bias performance realized by the non-coherent integration of signals received from each aperture 72,74 (trace 93) compared to their individual biases (traces 91 and 92, respectively). The above simulations assume that the full array 70 comprises an exemplary center height at 15 m above the surface, while the exemplary partitioned arrays comprise center heights at 15 m+/−1.125 m above the surface. While the embodiments of FIGS. 6 and 7 illustrate array partitions which do not overlap (i.e. do not share common T/R modules between partitions), embodiments of the present disclosure may also include at least partially overlapping or interleaved partitions.

Accordingly, it has been shown that increases in propagation factor and elevation angle bias performance of an exemplary radar system may be realized by operating the system in a frequency diverse or a spatially diverse manner. Embodiments of the present disclosure further include the integration of both of these techniques to further minimize signal fading and bias errors to track metrics such as elevation angle accuracy, RCS accuracy, range accuracy and sensitivity, all within a single PRI. Moreover, independent partitioning of transmit and receive apertures, each under independent beam steering control, further enhances operating performance.

Figure 10:
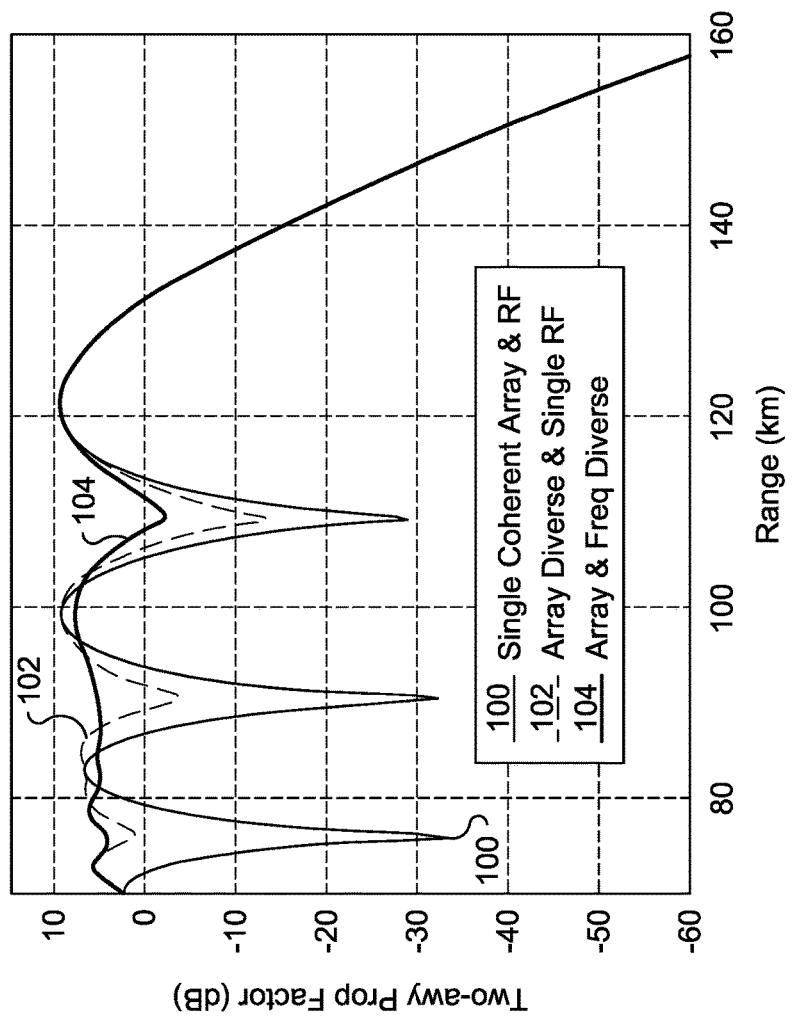
FIG. 10 is a graphical illustration showing improved propagation factor performance of a radar system operating with both frequency and spatial diversity.

Referring generally to FIG. 10, the further benefits of spatial diversity techniques used in conjunction with frequency diversity techniques according to embodiments of the present disclosure are shown. Specifically, illustrated trace 100 represents the propagation factor performance resulting from the transmission of a single frequency reference pulse from a single array. Trace 102 represents the propagation factor performance resulting from the transmission of a single frequency reference pulse from each of two sub-apertures of a partitioned array as shown and described with respect to FIG. 7. The propagation factor performance realized by the combination of both frequency diversity and spatial diversity techniques is illustrated by trace 104. In the exemplary simulation, trace 104 represents propagation factor performance resulting from the output of three distinct sequentially transmitted pulses (e.g., pulses having the characteristics set forth above with respect to FIGS. 2-5) from each of two discrete partitions of an antenna array (e.g., the partitioned array shown and described above with respect to FIGS. 7-9). As illustrated, the combination of these two techniques results in further improvements in the two-way propagation factor $F^4$ performance. Likewise, FIG. 11 illustrates elevation bias angle improvements realized between the single frequency, single array mode of operation (trace 110), the spatially diverse, single frequency mode of operation (trace 112), and the frequency and spatially diverse mode of operation (trace 114), as set forth with respect to FIG. 10.

While the frequency diverse modes of operation according to embodiments of the present disclosure have been shown and described in the context of transmitting frequency-like pulses from each of a plurality (e.g., two) of array antenna sub-apertures, embodiments of the present disclosure may include techniques to identify the sub-aperture from which a given return signal had originated. This may be achieved by, for example, slightly offsetting the carrier (center) RF frequencies of the pulses output by a given sub-aperture compared to those output by other sub-apertures (e.g., each sub-aperture's pulses are offset by an individual pulse's bandwidth which may be on the order of a few megahertz). Waveform modulation diversity may also be used. For example, center frequencies of the pulses transmitted by each sub-aperture may be equal, however, variations in the waveforms modulations of these signals may be implemented. For example, one sub-aperture may utilize an increasing LFM waveform (or "up chirp"), which another sub-aperture may utilize a decreasing LFM waveform (or "down chirp"). In this way, the source of the return signals may be determined post-pulse compression processing.

It should also be understood that for both frequency and spatial diversity techniques, while the multiple sub-apertures per antenna array may generally be time synchronized, independent RF and beam steering commands may be provided. As described above, these commands may be generated by a mode control processor of a system, and may be based on real-time tracked target return data (e.g., target characteristics derived from prior track PRIs) sourced from a target detection processor of the system. From this data, desired RF and beam steering commands (e.g., amplitude and phase commands), as well as timing control signals, are provided to each of the T/R modules and/or the digital beamformer of the system to generate desired or target sub-aperture beams. These commands may be reconfigurable between PRIs.

Figure 11:
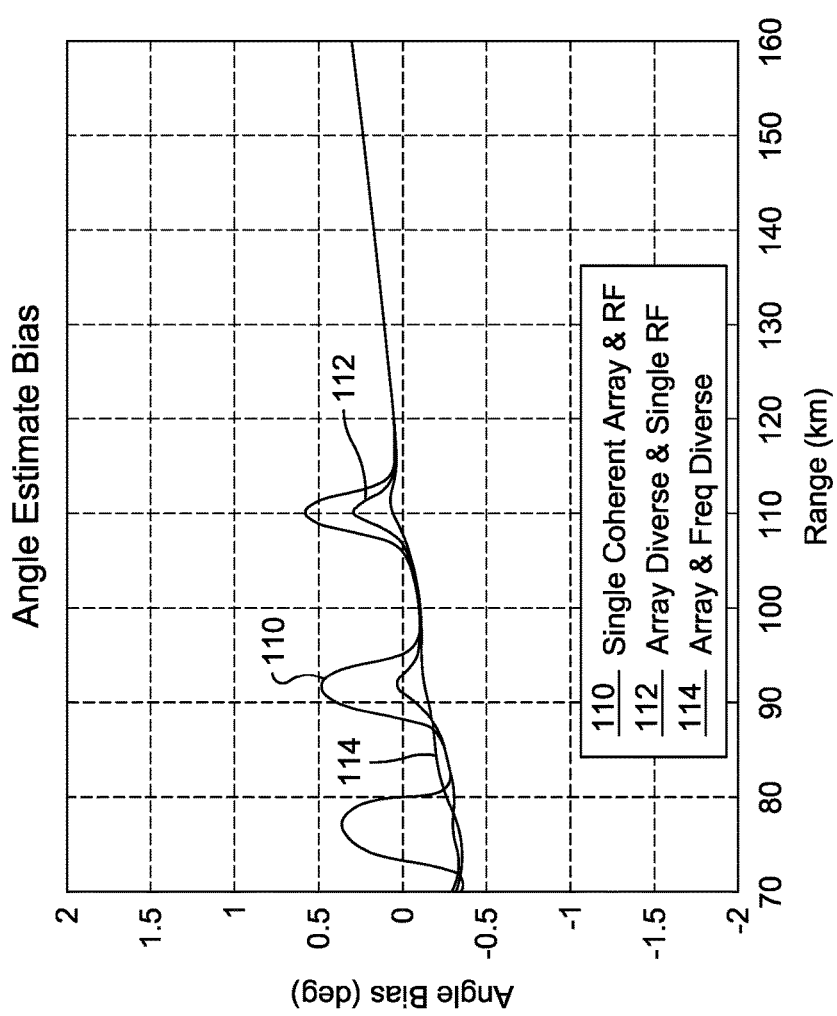
FIG. 11 is a graphical illustration showing improved elevation angle bias performance of a radar system operating with both frequency and spatial diversity.
Figure 12:
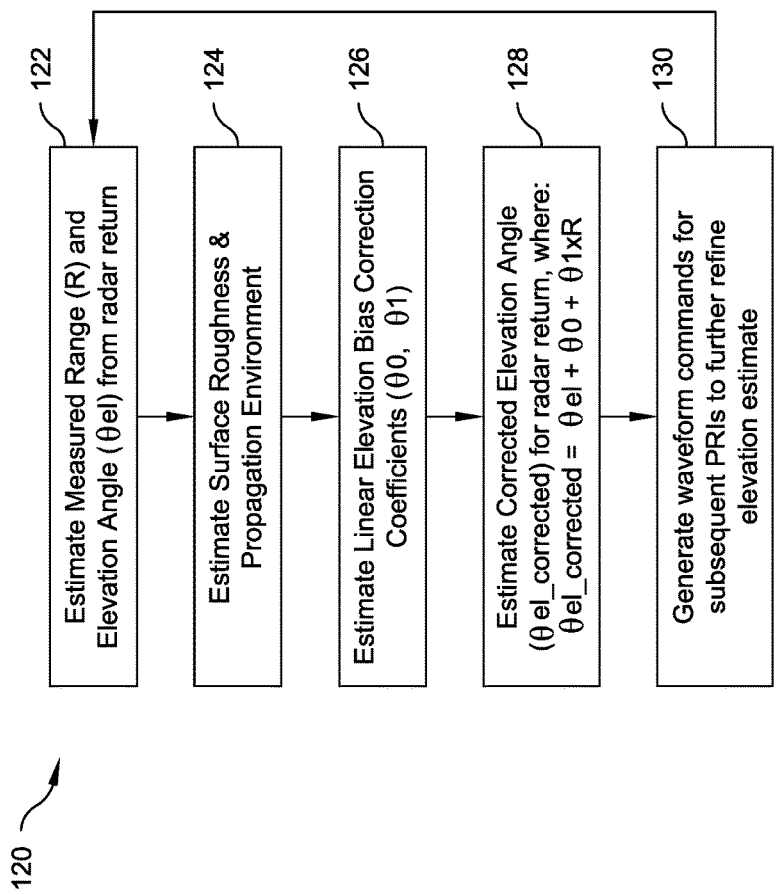
FIG. 12 is a simplified diagram illustrating a residual elevation bias error correction process according to an embodiment of the present disclosure.

While the integration of spatial and frequency diversity techniques has been shown to significantly reduce elevation angle bias errors, residual errors that vary linearly as a function of estimated target range for a given propagation condition and surface roughness may still exist as shown in FIG. 11. Accordingly, a third technique for improving system performance according to an embodiment of the present disclosure includes the generation and application of linear elevation bias correction coefficients or weights to a measured elevation angle from the radar return. This further mitigates the residual multipath bias errors remaining after the above-described frequency and spatial diversity techniques have been implemented. Referring generally to FIG. 12, an exemplary residual bias correction operation 120 begins with an estimate 122 of range and elevation angle of a target generated from processed radar return data. Without a priori knowledge of the specific operational environment, an initial estimate 124 of surface roughness and the propagation environment is made. This estimate may be based on, for example, one or both of 1) available surface roughness and propagation information received from a user/control interface or target detection processor (e.g., from long term average environmental database and/or clutter map information for the radar latitude/longitude location), or 2) the average required operational surface roughness and propagation conditions under which the radar system must operate (e.g., residing in the user/control interface or the target detection processor). Based on this environmental information, an initial set of elevation bias correction coefficients are estimated 126 via deterministic models consistent with those that generated the elevation angle bias curves in FIG. 11. These coefficients are then applied to the measured elevation angle to generate an estimated 128 corrected value. Based on the estimated range and elevation angle, waveform amplitude, phase and timing commands may be generated 130 (or existing commands altered) for subsequent transmissions (e.g. in subsequent PRIs) to further refine range and elevation estimates. As illustrated, the bias correction operation may be iterative, with further updates or refinements made based on subsequent real time radar returns within the target detection processor (e.g., measured time series data derived from prior PRIs/target returns), or operator provided data entered through a user/control interface.

The embodiments are provided by way of example only, and other embodiments for implementing the methods described herein may be contemplated by one of skill in the pertinent art without departing from the intended scope of this disclosure. For example, processing systems described herein may include memory containing data, which may include instructions, the instructions when executed by a processor or multiple processors, cause the steps of a method for performing the operations set forth herein. The above-described processing components (e.g. mode control processor 20, digital signal processor/beamformer 24, detection processor 26) may be embodied as a single multi-purpose processor, or any other number of discrete processors suitable for performing the described operations without departing from the scope of the present disclosure. Software may be embodied in a non-transitory machine readable medium upon which program instructions may be stored, the stored instructions when executed by a processor cause the processor to perform the steps of the methods described herein. Any suitable machine readable medium may be used, including but not limited to, magnetic or optical disks, for example CD-ROM, DVD-ROM, floppy disks and the like. Other media also fall within the intended scope of this disclosure, for example, dynamic random access memory (DRAM), random access memory (RAM), read-only memory (ROM) or flash memory may also be used.

While the foregoing invention has been described with reference to the above-described embodiment, various additional modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

The invention claimed is:

1. A phased array radar system, comprising:
an array antenna including a plurality of transmit/receive (T/R) modules;
one or more receiver/exciters and one or more computer processors in communication with the plurality of T/R modules; and
a memory in communication with the one or more computer processors and storing program instructions, the one or more computer processors operative with the program instructions to:
generate a first control signal for the one or more receiver/exciters to cause one or more of the plurality of T/R modules to transmit a first radio frequency (RF) pulse of a first center frequency from a first portion of the antenna array at a first elevation angle of less than 10 degrees,
generate a second control signal for the one or more receiver/exciters to cause one or more of the plurality of T/R modules to transmit a second RF pulse of a second center frequency, distinct from the first center frequency, from the first portion of the antenna array at a second elevation angle of less than 10 degrees;
generate a third control signal for the one or more receiver/exciters to cause one or more of the plurality of T/R modules to transmit a third RF pulse of a third center frequency from a second portion of the antenna array at a third elevation angle of less than 10 degrees,
generate a fourth control signal for the one or more receiver/exciters to cause one or more of the plurality of T/R modules to transmit a fourth RF pulse of a fourth center frequency, distinct from the third center frequency, from the second portion of the antenna array at a fourth elevation angle of less than 10 degrees;
non-coherently integrate received return signals originating from the first, second, third and fourth RF pulses; and
perform target detection processing on the integrated received return signals.

2. The system of claim 1, wherein at least one of the first and second RF pulses comprises a waveform modulation that is distinct from that of at least one of the third and fourth RF pulses.

3. The system of claim 2, wherein each of the first and second RF pulses comprises a waveform modulation that is distinct from each waveform modulation of the third and fourth pulses.

4. The system of claim 3, wherein the center frequencies of the first and second RF pulses are equal to the center frequencies of the third and fourth RF pulses.

5. The system of claim 4, wherein the one or more computer processors is further operative with the program instructions to:
generate a fifth control signal for the one or more receiver/exciters to cause one or more of the plurality of T/R modules to transmit a fifth RF pulse of a fifth frequency from the first portion of the antenna array; and
generate a sixth control signal for the one or more receiver/exciters to cause one or more of the plurality of T/R modules to transmit a sixth RF pulse of a sixth frequency from the second portion of the antenna array; and
wherein the first frequency is selected to be at or near a minimum radar operating frequency of the system,
wherein the second frequency is selected to be at or near a maximum radar operating frequency of the system, and
wherein the fifth frequency is selected to be intermediate the first frequency and the second frequency.

6. The system of claim 5, wherein the first and third frequencies are equal, wherein the second and fourth frequencies are equal, and wherein the fifth and sixth frequencies are equal.

7. The system of claim 1, wherein the first and second center frequencies are not equal to the third and fourth center frequencies.

8. The system of claim 1, wherein the first, second, third and fourth RF pulses are transmitted within a single pulse repetition interval (PRI) of the system.

9. The system of claim 1, wherein the first portion of the antenna array is defined by a first subset of the plurality of T/R modules, and the second portion of the antenna array is defined by a second subset of the plurality of T/R modules.

10. The system of claim 1, wherein the one or more computer processors is further operative with the program instructions to estimate a range and elevation angle for a target detected in the integrated received return signals.

11. A phased array radar system, comprising:
an array antenna including a plurality of transmit/receive (T/R) modules;
one or more receiver/exciters and one or more computer processors in communication with the plurality of T/R modules; and
a memory in communication with the one or more computer processors and storing program instructions, the one or more computer processors operative with the program instructions to:
generate a first control signal for the one or more receiver/exciters to cause one or more of the plurality of T/R modules to transmit a first radio frequency (RF) pulse of a first center frequency from a first portion of the antenna array,
generate a second control signal for the one or more receiver/exciters to cause one or more of the plurality of T/R modules to transmit a second RF pulse of a second center frequency, distinct from the first center frequency, from the first portion of the antenna array;
generate a third control signal for the one or more receiver/exciters to cause one or more of the plurality of T/R modules to transmit a third RF pulse of a third center frequency from a second portion of the antenna array,
generate a fourth control signal for the one or more receiver/exciters to cause one or more of the plurality of T/R modules to transmit a fourth RF pulse of a fourth center frequency, distinct from the third center frequency, from the second portion of the antenna array;
non-coherently integrate received return signals originating from the first, second, third and fourth RF pulses; and
perform target detection processing on the integrated received return signals;
wherein the one or more computer processors is further operative with the program instructions to estimate a corrected elevation angle based on at least an estimate of surface roughness and propagation environment factors.

12. A method of operating a phased array radar system including an array antenna including a plurality of transmit/receive (T/R) modules in communication with one or more receiver/exciters and one or more computer processors, comprising the steps of:
generating, by the one or more computer processors, a first control signal for the one or more receiver/exciters to cause transmission, by one or more of the plurality of T/R modules, of a first radio frequency (RF) pulse of a first center frequency from a first portion of the antenna array,
responsive to the one or more receiver/exciters receiving the first control signal, transmitting, by one or more of the plurality of T/R modules, the first RF pulse of the first center frequency from the first portion of the antenna array;
generating, by the one or more computer processors, a second control signal for the one or more receiver/exciters to cause transmission, by one or more of the plurality of T/R modules, of a second RF pulse of a second center frequency, distinct from the first center frequency, from the first portion of the antenna array;
responsive to the one or more receiver/exciters receiving the second control signal, transmitting, by one or more of the plurality of T/R modules, the second RF pulse of the second center frequency from the first portion of the antenna array;
generating, by the one or more computer processors, a third control signal for the one or more receiver/exciters to cause transmission, by one or more of the plurality of T/R modules, of a third RF pulse of a third center frequency from a second portion of the antenna array,
responsive to the one or more receiver/exciters receiving the third control signal, transmitting, by one or more of the plurality of T/R modules, the third RF pulse of the third center frequency from the second portion of the antenna array;
generating, by the one or more computer processors, a fourth control signal for the one or more receiver/exciters to cause transmission, by one or more of the plurality of T/R modules, of a fourth RF pulse of a fourth center frequency, distinct from the third center frequency, from the second portion of the antenna array;
responsive to the one or more receiver/exciters receiving the fourth control signal, transmitting, by one or more of the plurality of T/R modules, the fourth RF pulse of the fourth center frequency from the second portion of the antenna array;

receiving, by the one or more of the plurality of T/R modules, return signals corresponding to the first, second, third, and fourth RF pulses;

non-coherently integrating, by the one or more computer processors, the received return signals corresponding to from the first, second, third and fourth RF pulses; and performing, by the one or more computer processors, target detection processing on the integrated received return signals;

wherein the first, second, third and fourth RF pulses are transmitted at center frequencies spanning a full radar operating bandwidth within a single pulse repetition interval (PRI) of the system.

13. The method of claim 12, wherein at least one of the first and second RF pulses comprises a waveform modulation that is distinct from that of at least one of the third and fourth RF pulses, and wherein the center frequencies of the first and second RF pulses are equal to the center frequencies of the third and fourth RF pulses, respectively.

14. The method of claim 12, wherein the center frequencies of the first and second RF pulses are not equal to the center frequencies of the third and fourth RF pulses.

15. The method of claim 12, wherein the step of transmitting the first and second RF pulses from the first portion of the antenna array of the system comprises transmitting the first and second RF pulses from a first subset of a plurality of transmit/receive (T/R) modules of the antenna array, and wherein the step of transmitting the third and fourth RF pulses from the second portion of the antenna array of the system comprises transmitting the third and fourth RF pulses from a second subset of the plurality of T/R modules of the antenna array.

16. The method of claim 12, further comprising the step of estimating a range and elevation angle for a target detected in the integrated received return signals.

17. The method of claim 16, further comprising the step of estimating a corrected elevation angle based on at least an estimate of surface roughness and propagation environment factors.

* * * * *